(12) United States Patent
Kaura et al.

(10) Patent No.: US 9,622,270 B2
(45) Date of Patent: Apr. 11, 2017

(54) BEARER MANAGEMENT

(71) Applicant: Samsung Electronics Co., Ltd., Gyeonggi-do (KR)

(72) Inventors: Ricky Kaura, Middlesex (GB); Youngkyo Baek, Seoul (KR)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 14/652,661

(22) PCT Filed: Dec. 19, 2013

(86) PCT No.: PCT/KR2013/011857
§ 371 (c)(1),
(2) Date: Jun. 16, 2015

(87) PCT Pub. No.: WO2014/098492
PCT Pub. Date: Jun. 26, 2014

(65) Prior Publication Data
US 2015/0351136 A1 Dec. 3, 2015

(30) Foreign Application Priority Data
Dec. 19, 2012 (GB) .................... 122906.8

(51) Int. Cl.
*H04W 76/02* (2009.01)
*H04W 76/06* (2009.01)
(Continued)

(52) U.S. Cl.
CPC ......... *H04W 76/02* (2013.01); *H04W 76/064* (2013.01); *H04W 76/066* (2013.01);
(Continued)

(58) Field of Classification Search
CPC ..... H04W 4/22; H04W 76/007; H04W 76/02; H04W 76/025; H04W 76/064; H04W 76/066
See application file for complete search history.

(56) References Cited

U.S. PATENT DOCUMENTS

| 7,787,855 B2 * | 8/2010 | Zhao | H04W 4/22 455/404.1 |
| 7,933,242 B2 * | 4/2011 | Kolding | H04L 47/10 370/329 |

(Continued)

FOREIGN PATENT DOCUMENTS

| CN | 102625412 | 8/2012 |
| EP | 2391176 | 11/2011 |

(Continued)

OTHER PUBLICATIONS

PCT/ISA/237 Written Opinion issued on PCT/KR2013/011857 (pp. 8).

(Continued)

*Primary Examiner* — Mounir Moutaouakil
(74) *Attorney, Agent, or Firm* — The Farrell Law Firm, P.C.

(57) ABSTRACT

A method of establishing a bearer in a packet switched mobile wireless communications network comprising a mobile device and a network node, and a corresponding network. A predetermined maximum number of bearers can be established for the mobile device within the network. Bearer information can be sent indicating the predetermined maximum number of bearers, a remaining number of bearers, or that no more bearers can be established. If no more bearers can be established and a further bearer is required a bearer previously established for the mobile device within the network can be released and if required a bearer synchronization procedure can be performed. A further bearer (Continued)

for the mobile device within the network can then be established. Alternatively, if the mobile device determines that an emergency PDN connection is required, it can send a request for a further bearer to the network node. If a current number of bearers established for the mobile device is equal to the maximum number of bearers, the network node can release a previously established bearer establish a bearer for an emergency PDN connection.

12 Claims, 7 Drawing Sheets

(51) Int. Cl.
    *H04W 4/22*         (2009.01)
    *H04W 76/00*       (2009.01)

(52) U.S. Cl.
    CPC ............ *H04W 4/22* (2013.01); *H04W 76/007* (2013.01); *H04W 76/025* (2013.01)

(56) References Cited

U.S. PATENT DOCUMENTS

| | | | | |
|---|---|---|---|---|
| 8,185,107 | B2* | 5/2012 | Faccin | H04L 29/12216 370/331 |
| 8,248,962 | B2* | 8/2012 | Zhao | H04W 76/025 370/252 |
| 8,892,144 | B2* | 11/2014 | Shaw | H04L 12/28 370/254 |
| 2001/0026538 | A1 | 10/2001 | Bruss | |
| 2010/0297979 | A1 | 11/2010 | Watfa et al. | |
| 2011/0292888 | A1 | 12/2011 | Deu-Ngoc et al. | |
| 2012/0082029 | A1 | 4/2012 | Liao | |
| 2012/0094627 | A1 | 4/2012 | Suh et al. | |
| 2012/0238236 | A1 | 9/2012 | Liao | |
| 2013/0136114 | A1 | 5/2013 | Hietalahti et al. | |
| 2014/0341041 | A1* | 11/2014 | Velev | H04Q 3/0045 370/236 |
| 2015/0181000 | A1* | 6/2015 | Holtmanns | H04L 67/325 370/230 |

FOREIGN PATENT DOCUMENTS

| | | |
|---|---|---|
| GB | 2489545 | 10/2012 |
| GB | 2501110 | 10/2013 |
| KR | 1020100053418 | 5/2010 |
| WO | WO 0152583 | 7/2001 |

OTHER PUBLICATIONS

PCT/ISA/210 Search Report issued on PCT/KR2013/011857 (pp. 4).
3GPP TS 23.167 V11.6.0, '3GPP TSGSSA; IP Multimedia Subsystem (IMS) emergency sessions (Release 11)', Dec. 18, 2012, (http://www.3gpp.org/DynaReport/23167.htm), (pp. 45).
3GPP TSG-CT WG1 Meeting #80, Prague (Czech Republic), Oct. 15-19, 2012, (pp. 9).
Search and Examination Report dated Jun. 14, 2013, issued in counterpart Appln. No. GB1222906.8 (pp. 3).
Search and Examination Report dated Nov. 28, 2014 issued in counterpart Appln. No. GB1222906.8 (pp. 3.

* cited by examiner

BEARER MANAGEMENT

PRIORITY

This application is a National Phase Entry of PCT International Application No. PCT/KR2013/011857, which was filed on Dec. 19, 2013, and claims priority to United Kingdom Patent Application No. 1222906.8, which was filed on Dec. 19, 2012, the contents of each of which are incorporated herein by reference.

TECHNICAL FIELD

The present invention relates to bearer management in a packet switched (PS) mobile communications network. Embodiments of the invention may be implemented in a 3rd Generation Partnership Project (3GPP) compliant mobile communications system comprising User Equipment (UE) and network equipment. In particular, embodiments of the present invention may be implemented in a 3GPP Long Term Evolution (LTE) and LTE Advanced compliant PS network, though the present invention is not limited to any particular PS network technology. Embodiments of the present invention address issues which arise when the maximum number of bearers that the network supports has already been reached but the UE is unaware of this fact when a further bearer is requested by the UE. This situation can arise when a UE attempts to establish an emergency call causing the network to reject the request. This causes the UE to request explicit deactivation of a bearer before retrying the establishment of the emergency call. This process delays the establishment of the emergency call. Emergency calls are subject to strict rules and regulation in certain jurisdictions, and emergency calls should be established and routed to Public Safety Answering Points (PSAPs) as quickly as possible to avoid delay and possible litigation because of any delays incurred.

BACKGROUND ART

3GPP design, specify and standardise technologies for mobile (cellular) wireless communications s. Specifically 3GPP produces a series of technical reports (TR) and technical specifications (TS) that define 3GPP technologies. The focus of 3GPP is currently the specification of standards beyond the $3_{rd}$ Generation (3G) of mobile networks, and in particular an Evolved Packet System (EPS) offering enhancements over 3G networks, in particular higher data rates. The set of specifications for the EPS comprises two work items: Systems Architecture Evolution (SAE, concerning the core network) and LTE concerning the air interface. The first set of EPS specifications were released as 3GPP Release 8 in December 2008. Despite LTE strictly referring only to the air interface, LTE is commonly used to refer to the whole of the EPS, including by 3GPP themselves. LTE is used in this sense in the remainder of this specification. LTE enhancements, including LTE Advanced offering still higher data rates compared to LTE, have followed up to and including 3GPP Release 11 in September 2012. LTE Advanced is considered to be a 4th generation (4G) mobile communication system by the International Telecommunication Union (ITU). LTE is an evolution of the 3GPP 3G Universal Mobile Telecommunication System (UMTS) and shares certain high level components and protocols with UMTS. A key difference is that whereas UMTS allows for both PS and Circuit Switched (CS) data transfer, with CS being used for voice calls, LTE is a wholly PS system for the delivery of packet data, regardless of the content of the data packets.

As noted above, the present invention is not limited to LTE. However, particular embodiments of the present invention may be implemented within an LTE mobile network and detailed descriptions of embodiments of the invention are presented in the context of an LTE network. Therefore, an overview of an LTE network is shown in FIG. 1. The LTE system comprises three high level components: at least one UE 102, an Evolved UMTS Terrestrial Radio Access Network (E-UTRAN) 104 and an Evolved Packet Core (EPC) 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces media is represented by solid lines and signalling is represented by dashed lines.

The UE 102 comprises a communication device, referred to as Mobile Equipment (ME) and a Universal Integrated Circuit Card (UICC) which is a smart card, commonly referred to as the Subscriber Identity Module (SIM) card. The UICC stores identification information which uniquely identifies the UE user.

The E-UTRAN 104 comprises a single type of component: the evolved Node B (eNB) which is responsible for handling radio communications between the UE 102 and the EPC 106 across the air interface. An eNB is a base station that controls UEs 102 in one or more cell. Typically there is a plurality of eNBs within an LTE system, and the eNBs comprising the E-UTRAN are connected to the EPC 106.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). The air interface can be considered to be split into two levels: the Access Stratum (AS) and the Non Access Stratum (NAS). Signalling messages between the MME 114 and the UE 102 are transported via the NAS protocol. Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

An LTE system transports data from one part of the system to another via bearers. The most important bearer from the perspective of an end user is the EPS bearer between a UE 102 and a P-GW 112. The EPS bearers are responsible for transporting data between the UE 102 and servers and PDNs outside of the EPC 106. In the remainder of this specification the term "bearer" will be used generically (including EPS bearers) to refer to any bearer between the UE 102 and another part of the LTE network, and in particular part of the EPC.

A bearer may be considered to be a logical or virtual connection between two end points. A bearer may also be considered to be a data pipe between two such end points. Each bearer may be defined in terms of minimum Quality of Service (QoS), minimum data rate, maximum error rate and maximum delay. In an LTE network, for each UE 102 when the UE first registers with the network, it either connects to a PDN for the default Access Point Name (APN), which is configured in the HSS, or it connects to a PDN for an APN provided by the UE at time of Attach. On establishing a standalone PDN connection, a default EPS bearer is established between the UE and a selected P-GW 112. Additional PDN connections may later be established between the UE 102 and alternative P-GWs 112b, which results in the establishment of further default EPS bearers for these PDN connections. Dedicated bearers may be established by the EPC between the UE 102 and a P-GW 112 for which there exists a default bearer, for instance in order to establish a data flow with a higher QoS or minimum bit rate.

A UE 102 requests a new bearer for a new data communication session if the required service cannot be provided upon the default bearer. This includes when establishing a new voice call. An LTE network, and in particular an MME 114 responsible for that UE 102, can only support a limited number of bearers per UE 102. This maximum number of bearers per UE 102 is defined by the LTE specifications based on a protocol limitation defined in sub-clause 11.2.3.15 of 3GPP Technical Specification 24.007 version11.0.0 Release 11, "Group Core Network and Terminals; Mobile Radio Interface Signalling Layer 3; General Aspects" available from http://www.3gpp.org. The maximum number of bearers in theory cannot exceed 11. For a General Packet Radio Service (GPRS) network, the corresponding limit on Packet Data Protocol (PDP) contexts is defined in sub-clause 10.5.6.2 of 3GPP Technical Specification 24.008 version 11.4.0 Release 11, "Digital cellular telecommunications system (Phase 2+); Universal Mobile Telecommunications System (UMTS); LTE; Mobile radio interface Layer 3 specification; Core network protocols; Stage 3" available from http://www.3gpp.org. However, in practice this limit can vary widely between different LTE implementations. However, as defined by the existing LTE specifications, a UE 102 knows only the number of active bearers that it has established with the network, and not the maximum number of available bearers. Referring now to FIG. 2, this illustrates a situation in which the maximum number of bearers for a UE 102 has already been reached, and the UE 102 requests a further bearer. In particular, FIG. 2 illustrates a situation in which the UE 102 requests a further bearer in order to allow a user to make an emergency voice call.

FIG. 2 shows signalling messages exchanged between a UE 102 and the associated MME 114 with which the UE 102 is registered. As noted at 202, the UE has already established a default bearer for a connection to an external PDN (the internet) and a default bearer for a connection to an IP Multimedia Subsystem (IMS). IMS is a separate 3GPP specified network communicating with the EPC for handling real time IP multimedia services for example Voice over IP (VoIP), which is used by LTE for voice calls. As noted at 204 the MME supports a maximum of two bearers per UE. It will be appreciated that in an operational LTE network the maximum number of bearers may be significantly higher. The UE is not aware that the MME supports a maximum of 2 bearers, and that the maximum has already been reached.

As noted at 206, the UE and the MME are initially in an EMM-IDLE state. This represents a state in which there is no NAS signalling connection between the UE and the network. It will be appreciated that in an alternative scenario the UE may initially be in the EMM-connected state (that is, in a state in which there is a NAS signalling connection between the UE and the network).

At 208 the user of the UE wishes to make an emergency voice call and takes the necessary action at the UE to cause the UE 102 to request a further bearer. At 210 the UE sends a Service Request message to the MME. The service request message is an EMM message forming part of the service request procedure which takes place when the UE is in the EMM-IDLE state but wishes to communicate with the network. The service request message requests that the MME moves the UE to the EMM-CONNECTED state. At 212 the UE then sends a PDN Connectivity Request message to the MME. The PDN Connectivity Request message is an ESM message which asks the network to establish a bearer for a connection to an emergency PDN. Note that if the UE was already in EMM-CONNECTED state, then step 210 is omitted.

At 214 the MME responds with a PDN Connectivity Reject message including an error code indicating that the maximum number of bearers supported by the MME for that UE has already been reached (error code #65). Error code #65 is defined as the max number of EPS bearers per Public Land Mobile Network (PLMN). This error code is specified in section 6.5.1.4 of 3GPP Technical Specification 24.301 version 11.4.0 Release 11, "Universal Mobile Telecommunications System (UMTS); LTE; Non-Access-Stratum (NAS) protocol for Evolved Packet System (EPS); Stage 3" available from http://www.3gpp.org. Section 6.5.1.4 of TS 24.301 specifies ESM error codes in the event that a PDN Connectivity Request cannot be accepted by the network. The UE can then determine the network's maximum number of EPS bearers. This can be stored at the UE, though will be released if the UE is switched off, or the USIM is erased. This is the first time at which the UE becomes aware of the maximum number of bearers supported by the MME.

In order to make the emergency call, the UE performs explicit deactivation of one of the established PDN connections. Specifically, the UE sends a PDN Disconnect Request message 216 to the MME. The MME then sends a Deactivate EPS Bearer Context Request message 218 from, to which the UE responds with a Deactivate EPS Bearer Context Accept message 220. Now that there is one less bearer than the maximum available number of bearers, at 222 the UE again sends the PDN Connectivity Request message requesting a bearer for a connection to an emergency PDN. This time, at 224 the MME responds with an Activate Default EPS Bearer Context Request message which includes the EPS bearer identity for the newly established EPS bearer, together with other information, for example a Quality of Service (QoS) measure and an IP address associated with the bearer which may be needed by the UE to make use of the bearer. At 226 the UE returns an Activate Default EPS Bearer Context Accept message which acknowledges receipt of the new bearer information. Messages 222 to 226 are ESM messages. At 228 the emergency PDN connection has been established and the emergency voice call can take place.

It will be appreciated that FIG. 2 is a simplification of signalling messages sent between the UE and the MME, and in particular the encapsulation of EMM and ESM messages within other lower layer protocols between the UE and the E-UTRAN, or between the E-UTRAN and the MME, has been omitted.

The PDN Connectivity Request message sent from the UE to the MME at 212 identifies an Access Point Name (APN) and PDN type for the requested bearer, together with further Information Elements (IEs) specifying information specific to the requested PDN connection. Sections 6.5.1.4A and 6.5.1.6 of 3GPP TS 24.301 note that as an exception even if the maximum number of bearers has already been established for the UE, if a further PDN Connectivity Request message is received with the same combination of APN and PDN type as an existing, non-emergency PDN connection then the further PDN Connectivity Request message can be accepted under two limited circumstances.

The first circumstance is if all of the IEs in the further PDN Connectivity Request message exactly match those within a previous PDN Connectivity Request message and the MME has not received the Activate Default EPS Bearer Context Accept message 226 from the UE. This relates to a situation in which an Activate Default EPS Bearer Context Request message 224 sent by the MME in response to the earlier PDN Connectivity Request message was not received by the UE, such that the UE has resent the PDN Connectivity Request message. This is a limited error handling exception. Clearly this is of no benefit if the request for a further bearer is in order to make an emergency call (and not to retry a non-emergency call).

The second circumstance is if the IEs do not match, and the APN does not support multiple PDN connections. The MME may optionally either deactivate the existing EPS bearer context for the earlier PDN connection locally without notification to the UE and proceed with the requested PDN connectivity procedure, or the MME may respond with error code #55 "multiple PDN connections for a given APN not allowed". This second circumstance relates to a situation in which the UE has an already established EPS bearer for a particular PDN connection and requests a similar EPS bearer with different operating parameters, for instance QoS or data rate. This cannot relate to an emergency call scenario as the APN is never included in the PDN connectivity request when establishing an emergency PDN connection. The emergency PDN connection is determined through configuration at the MME.

It will be appreciated that while the signalling illustrated in FIG. 2 allows a bearer to be requested even if the maximum number of bearers has already been allocated, this is at the expense of unnecessary delay due to the UE having no knowledge of the maximum number of available bearers. Specifically, messages 212 and 214 are sent in order to advise the UE that the maximum number of bearers has already been reached. This results in a delay at the time of requesting the new bearer, largely due to the inherent delay for each signal transmitted across the air interface to and from the E-UTRAN. There has been significant effort to minimise all sources of delay within LTE systems, particularly where real time services including voice calls are concerned. However, delays persist if the maximum number of bearers has already been established. It will be appreciated that the source of delay described above in connection with FIG. 2 applies to all bearer requests. However, establishing an emergency call is particularly time sensitive, especially if a delay is sufficiently long that it is perceptible to the end user. Therefore, throughout the remainder of the present specification the example of establishing an emergency call will used.

As noted above, the present invention is broadly applicable to PS systems, and is not limited to LTE. Specifically, the present invention is applicable in any PS system in which connections from a mobile device to a server, network component or PDN comprise a logical or virtual connection or data pipe, and the maximum number of such connections is limited. For instance in 2nd generation (2G)/3G networks based on Global System for Mobile Communications (GSM) or UMTS, in the PS domain the equivalent of an EPS bearer is a PDP context. PDP contexts appear generally the same as EPS bearers from the perspective of the Mobile Station (MS, the equivalent of an LTE UE). One difference is that whereas a default EPS bearer is requested by the MS when registering with the EPC, a PDP context is only requested when the MS wishes to communicate with a server or a PDN in the outside world.

The number of PDP contexts that can be established for a single UE is limited, and not known to the MS. Section 6.1.3.0 of 3GPP TS 24.008 specifies how the maximum number of PDP contexts for an MS is determined. Similarly to the situation illustrated for LTE in FIG. 2, upon receipt of an Activate PDP Context Request Message the network may respond with an activate PDP context reject message with error code # "maximum number of PDP contexts reached".

Similarly to the exceptions described above in connection with FIG. 2, section 6.1.3.1.5 part (c) of 3GPP TS 24.008 notes that if an MS initiates a PDP context activation request for an already activated PDP context and all of the details of the request match exactly then the existing activated PDP context is deactivated locally within the network and the network proceeds with the requested PDP context activation. This situation relates to a limited error handling situation in which the MS did not receive the response to the original Activate PDP Context Request message. Alternatively, if the details of the new Activate PDP Context Request Message do not match an existing activated PDP context, but the Network layer Service Access Point Identifier (NSAPI) does match that of an existing PDP context then the network will deactivate the existing PDP context locally within the network and the network proceeds with the requested PDP context activation. Clearly the requirement for the NSAPI to match means that this exception only applies in the event the MS wishes to reinitialise the same PDP context for a unique data session, and is of not benefit in the event that the MS wishes to open a new data session. In the majority of instances, if a further Activate PDP Context Request message is received when the maximum number of PDP contexts has been reached the request causes error code #65 to be returned. Furthermore, these exceptions do not apply to a new Activate PDP Context Request Message with request type "emergency" and there is already a PDN connection for emergency bearer services existing. The trigger for the UE to reuse the same NSAPI and different combination of APN, PDP type and PDP address can arise when the UE itself has reached its maximum number of bearers or when the UE knows that the network has reached its maximum number of bearers. However, this does not apply when the network has reached the maximum number of bearers and the UE does not know that (and the UE has not reached its maximum). Thus, the UE has no cause to reuse an existing NSAPI.

The term "bearer" is used in connection with the present invention to refer to any logical or virtual connections between a UE and a component of a mobile communications network or an external server or PDN, and should not be considered to refer only to the particular forms of bearers defined in connection with LTE, despite embodiments of the present invention being described in detail in connection with LTE.

DISCLOSURE OF INVENTION

Technical Problem

It is an aim of embodiments of the present invention to obviate or mitigate one or more of the problems associated with the prior art, whether identified herein or elsewhere. In particular, it is an aim of certain embodiments of the present invention to minimise delay when establishing a new emergency call in a PS network when the maximum number of bearers allowed by the network for the UE has already been established (and the UE is not aware of this).

Solution to Problem

According to a first aspect of the present invention there is provided a method of establishing a bearer in a packet switched mobile wireless communications network comprising a mobile device and a network node, wherein a predetermined maximum number of bearers can be established for the mobile device within the network, the method comprising: sending bearer information from the network node to the mobile device either: when the number of bearers currently established for the mobile device within the network is less than the predetermined maximum number of bearers; or before a request for a further bearer is received at the network node from the mobile device if the number of bearers currently established for the mobile device within the network is equal to the predetermined maximum number of bearers; the bearer information indicating one of: the predetermined maximum number of bearers that can be established for the mobile device within the network; a remaining number of bearers that can be established for the mobile device within the network; or that no more bearers can be established for the mobile device within the network; and determining at the mobile device at a later point in time that a further bearer is required; wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the method further comprises: releasing, at the mobile device, a bearer previously established for the mobile device within the network; performing a bearer synchronisation procedure between the mobile device and the network node if required; sending a request for a further bearer from the mobile device to the network node; and establishing the further bearer for the mobile device within the network.

The bearer information may be sent from the network node to the mobile device when the number of bearers currently established for the mobile device within the network is less than the maximum number of bearers allowed by the network for the mobile device and the network establishes a further bearer for the mobile device within the network.

If the bearer information indicates the maximum number of bearers the method may further comprise: obtaining at the mobile device the current number of bearers; and comparing at the mobile device the current number of bearers to the maximum number of bearers.

The bearer information indicating the maximum number of bearers that can be established may be sent from the network node to the mobile device as part of a mobility management signalling message.

The mobility management signalling message including the bearer information may be sent in response to one of: a message received at the network node from the mobile device requesting that the mobile device be allowed to join the network; a message received at the network node from the mobile device when the mobile device moves between cells within the network; or a periodic update message received at the network node from the mobile device.

Bearer information may be sent from the network node to the mobile device as part of a session management signalling message.

The session management signalling message may be embedded within a session management container of a mobility management message sent in response to a message received at the network node from the mobile device requesting that the mobile device be allowed to join the network.

The session management signalling message may comprise one of: a message sent when activating a bearer for the mobile device within the network in response to a request to establish a further bearer received from the mobile device; and a general data session management notification signalling message.

The requested further bearer may be an emergency bearer, a priority bearer, or a normal bearer.

According to a second aspect of the present invention there is provided a method of establishing a bearer within a mobile device in a packet switched mobile wireless communications network which further comprises a network node, wherein a predetermined maximum number of bearers can be established for the mobile device within the network, the method comprising: receiving bearer information at the mobile device from the network node either: when the number of bearers currently established for the mobile device within the network is less than the predetermined maximum number of bearers; or before a request for a further bearer is received at the network node from the mobile device if the number of bearers currently established for the mobile device within the network is equal to the predetermined maximum number of bearers; the bearer information indicating one of: the predetermined maximum number of bearers that can be established for the mobile device within the network; a remaining number of bearers that can be established for the mobile device within the network; or that no more bearers can be established for the mobile device within the network; and determining at the mobile device at a later point in time that a further bearer is required; wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the method further comprises: releasing, at the mobile device, a bearer previously established for the mobile device within the network; performing at the mobile device a bearer synchronisation procedure between the mobile device and the network node if required; sending a request for a further bearer from the mobile device to the network node; and establishing at the mobile device the further bearer for the mobile device within the network.

According to a third aspect of the present invention there is provided a method of establishing a bearer within a network node in a packet switched mobile wireless communications network which further comprises a mobile device, wherein a predetermined maximum number of bearers can be established for the mobile device within the network, the method comprising: sending bearer information from the network node to the mobile device either: when the number of bearers currently established for the mobile device within the network is less than the predetermined maximum number of bearers; or before a request for a further bearer is received at the network node from the mobile device if the number of bearers currently established for the mobile device within the network is equal to the predetermined maximum number of bearers; the bearer information indicating one of: the predetermined maximum number of bearers that can be established for the mobile device within the network; a remaining number of bearers that can be established for the mobile device within the network; or that no more bearers can be established for the mobile device within the network; and wherein if the mobile device at a later point in time determines that a further bearer is required, and if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the method further comprises: performing at the network node a bearer synchronisation procedure between the mobile device and the network node if required; receiving a request for a further bearer at the network node from the mobile device; and establishing at the network node the further bearer for the mobile device within the network.

According to a fourth aspect of the present invention there is provided a packet switched mobile wireless communications network arranged to establish a bearer, wherein a predetermined maximum number of bearers can be established for a mobile device within the network, the packet switched mobile wireless communications network comprising: a mobile device; and a network node; wherein the network node is arranged to send bearer information to the mobile device either: when the number of bearers currently established for the mobile device within the network is less than the predetermined maximum number of bearers; or before a request for a further bearer is received at the network node from the mobile device if the number of bearers currently established for the mobile device within the network is equal to the predetermined maximum number of bearers; the bearer information indicating one of: the predetermined maximum number of bearers that can be established for the mobile device within the network; a remaining number of bearers that can be established for the mobile device within the network; or that no more bearers can be established for the mobile device within the network; and wherein the mobile device is arranged to determine at a later point in time that a further bearer is required; wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network: the mobile device is arranged to release a bearer previously established for the mobile device within the network; the mobile device and the network node are arranged to perform a bearer synchronisation procedure if required; the mobile device is arranged to send a request for a further bearer to the network node; and the mobile device and the network node are arranged to establish the further bearer.

According to a fifth aspect of the present invention there is provided a mobile device within a packet switched mobile wireless communications network which further comprises a network node, wherein a predetermined maximum number of bearers can be established for the mobile device within the network, the mobile device being arranged to establish a bearer, wherein the mobile device is arranged to: receive bearer information from the network node either: when the number of bearers currently established for the mobile device within the network is less than the predetermined maximum number of bearers; or before a request for a further bearer is received at the network node from the mobile device if the number of bearers currently established for the mobile device within the network is equal to the predetermined maximum number of bearers; the bearer information indicating one of: the predetermined maximum number of bearers that can be established for the mobile device within the network; a remaining number of bearers that can be established for the mobile device within the network; or that no more bearers can be established for the mobile device within the network; and determine at a later point in time that a further bearer is required; wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the mobile device is further arranged to: release a bearer previously established for the mobile device within the network; perform a bearer synchronisation procedure between the mobile device and the network node if required; send a request for a further bearer from the mobile device to the network node; and establish the further bearer for the mobile device within the network.

According to a sixth aspect of the present invention there is provided a network node within a packet switched mobile wireless communications network which further comprises a mobile device, the network node being arranged to establish a bearer, wherein a predetermined maximum number of bearers can be established for the mobile device within the network, wherein the network node is arranged to: send bearer information from the network node to the mobile device either: when the number of bearers currently established for the mobile device within the network is less than the predetermined maximum number of bearers; or before a request for a further bearer is received at the network node from the mobile device if the number of bearers currently established for the mobile device within the network is equal to the predetermined maximum number of bearers; the bearer information indicating one of: the predetermined maximum number of bearers that can be established for the mobile device within the network; a remaining number of bearers that can be established for the mobile device within the network; or that no more bearers can be established for the mobile device within the network; and wherein if the mobile device determines at a later point in time that a further bearer is required, and if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the network node is further arranged to: perform a bearer synchronisation procedure between the mobile device and the network node if required; receive a request for a further bearer from the mobile device; and establish the further bearer for the mobile device within the network.

According to a seventh aspect of the present invention there is provided a method of establishing a bearer in a packet switched mobile wireless communications network comprising a mobile device and a network node, wherein a predetermined maximum number of bearers can be established for the mobile device within the network, the method comprising: determining at the mobile device that an emergency PDN connection is required; and sending a request for a further bearer from the mobile device to the network node; wherein if a current number of bearers established for the mobile device is equal to the maximum number of bearers, the method further comprises: releasing, at the network node, a bearer previously established for the mobile device within the network; and establishing a bearer for an emergency PDN connection for the mobile device within the network.

Releasing, at the network node, a bearer previously established for the mobile device within the network may comprise selecting at the network node a bearer for release which is not for an emergency PDN connection.

The method may further comprise: performing a bearer synchronisation procedure between the mobile device and the network node after the emergency PDN connection has ended.

The method may further comprise: sending from the network node to the mobile device an indication that a bearer synchronisation procedure is required while establishing the bearer for the emergency PDN connection; and initiating at the mobile device the bearer synchronisation procedure after the emergency PDN connection has ended.

The method may further comprise: sending from the network node to the mobile device an indication that a bearer synchronisation procedure is required in a separate session management message; and initiating at the mobile device the bearer synchronisation procedure after the emergency PDN connection has ended.

The method may further comprise: initiating at the network node an explicit bearer deactivation procedure between the network node and the mobile device after the bearer for the emergency PDN connection has been established.

The method may further comprise: sending from the network node a session management status request containing the bearer identification of the bearer released by the network; and receiving at the mobile device the session management status request and deactivating the bearer locally in the mobile device.

According to an eighth aspect of the present invention there is provided a method of establishing a bearer within a network node in a packet switched mobile wireless communications network which further comprises a mobile device, wherein a predetermined maximum number of bearers can be established for the mobile device within the network, the method comprising: receiving a request for a further bearer from the mobile device; wherein if a current number of bearers established for the mobile device is equal to the maximum number of bearers, the method further comprises: releasing a bearer previously established for the mobile device within the network; and establishing a bearer for an emergency PDN connection for the mobile device within the network.

According to a ninth aspect of the present invention there is provided a packet switched mobile wireless communications network arranged to establish a bearer, wherein a predetermined maximum number of bearers can be established for a mobile device within the network, the packet switched mobile wireless communications network comprising: a mobile device; and a network node; wherein the mobile device is arranged to determine that an emergency PDN connection is required; and wherein the mobile device is arranged to send a request for a further bearer from the mobile device to the network node; wherein if a current number of bearers established for the mobile device is equal to the maximum number of bearers, the network node is further arranged to: release a bearer previously established for the mobile device within the network; and establish a bearer for an emergency PDN connection for the mobile device within the network.

According to a tenth aspect of the present invention there is provided a network node within a packet switched mobile wireless communications network which further comprises a mobile device, wherein a predetermined maximum number of bearers can be established for the mobile device within the network, the network node being arranged to establish a bearer, wherein the network node is arranged to: receive a request for a further bearer from the mobile device; wherein if a current number of bearers established for the mobile device is equal to the maximum number of bearers, the network node is further arranged to: release a bearer previously established for the mobile device within the network; and establish a bearer for an emergency PDN connection for the mobile device within the network.

The requested further bearer may be unrelated to any previously established bearer.

The packet switched mobile wireless communications system may be a General Packet Radio System, GPRS, network, a Universal Mobile Telecommunication System, UMTS, network, or a Long Term Evolution, LTE, network.

The packet switched mobile wireless communications system may be an LTE network, the mobile device comprises a User Equipment, UE, the network node comprises a Mobility Management Entity, MME, and the bearer comprises an Evolved Packet System, EPS, bearer.

Advantageous Effects of Invention

An advantage of embodiments of the present invention is that the time to request a bearer is minimised. In particular, embodiments of the present invention help to minimise delays in setting up emergency calls.

Another aspect of the invention provides a computer program comprising instructions arranged, when executed, to implement a method and/or apparatus in accordance with any one of the above-described aspects. A further aspect provides machine-readable storage storing such a program.

BRIEF DESCRIPTION OF DRAWINGS

Embodiments of the invention are further described hereinafter with reference to the accompanying drawings, in which.

MODE FOR THE INVENTION

The present inventor has identified that there are two main approaches to addressing the problem identified above associated with delay when requesting a new bearer. In particular, the present inventor has identified that there are two main approaches to minimising sources of delay when making an emergency call in a PS network. The first approach is to allow the mobile device to have knowledge of the maximum number of bearers. For the example of an LTE network, the first approach requires that the UE is kept aware by NAS protocol messages either about the number of bearers which the MME can accommodate, the number of bearers left that could be established or at the point at which the MME cannot establish any more bearers. Consequently, the UE can pre-emptively take action to locally release a bearer before the UE tries to request a further bearer over the maximum available. The second approach operates upon the network side and does not require the mobile device to have knowledge about the maximum number of bearers. For the example of an LTE network, the second approach requires that the network takes action to arbitrarily select a bearer to deactivate. Under the second approach, for an LTE network, although the MME is in an EMM-CONNECTED state, it locally deactivates an EPS bearer and either informs the UE that it needs to send a Tracking Area Update message to synchronise the bearers at the UE and the MME or the MME sends an ESM status message to the UE with the bearer identification of the locally deactivated bearer, requiring the UE to locally deactivate this bearer. Alternatively, the MME sends an explicit EPS bearer deactivation message before/after the emergency PDN connection has been established. A number of embodiments of the invention falling under either the first or second approach will now be described in connection with an example of an LTE network.

In accordance with a first embodiment of the invention a solution requiring knowledge at the UE is provided for an LTE network though LTE EMM messaging. The first embodiment requires that the MME incorporates an information element (IE) in Attach Accept and Tracking Area Update Accept EMM messages indicating the maximum number of EPS bearers which can be established for that UE.

Figure 1:
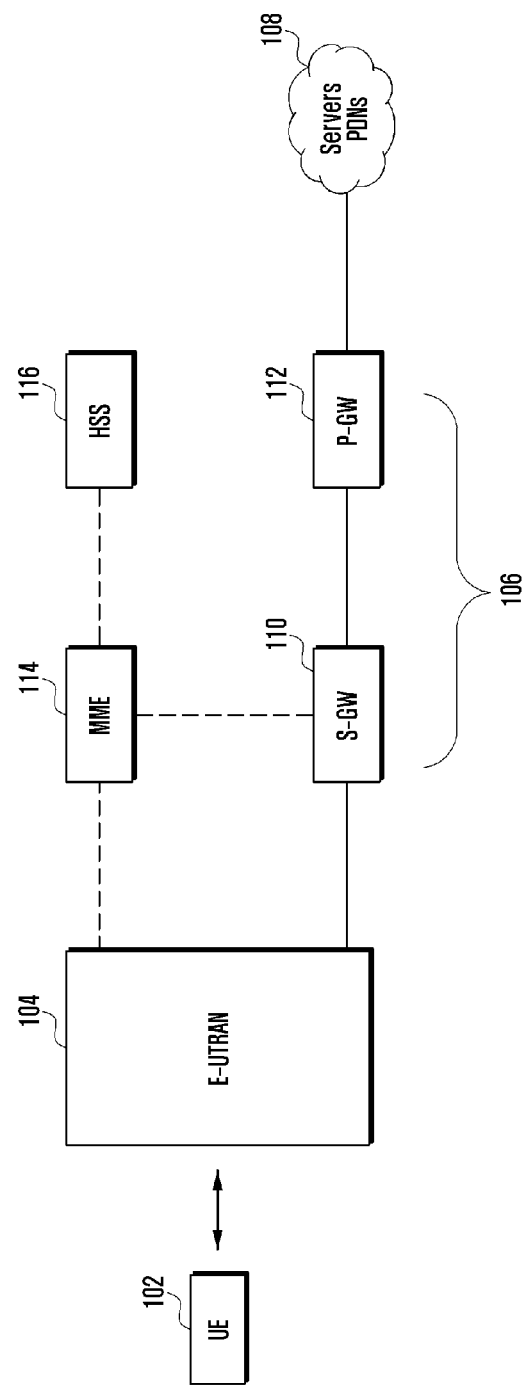
FIG. 1 schematically illustrates an overview of an LTE mobile communication network.
Figure 2:
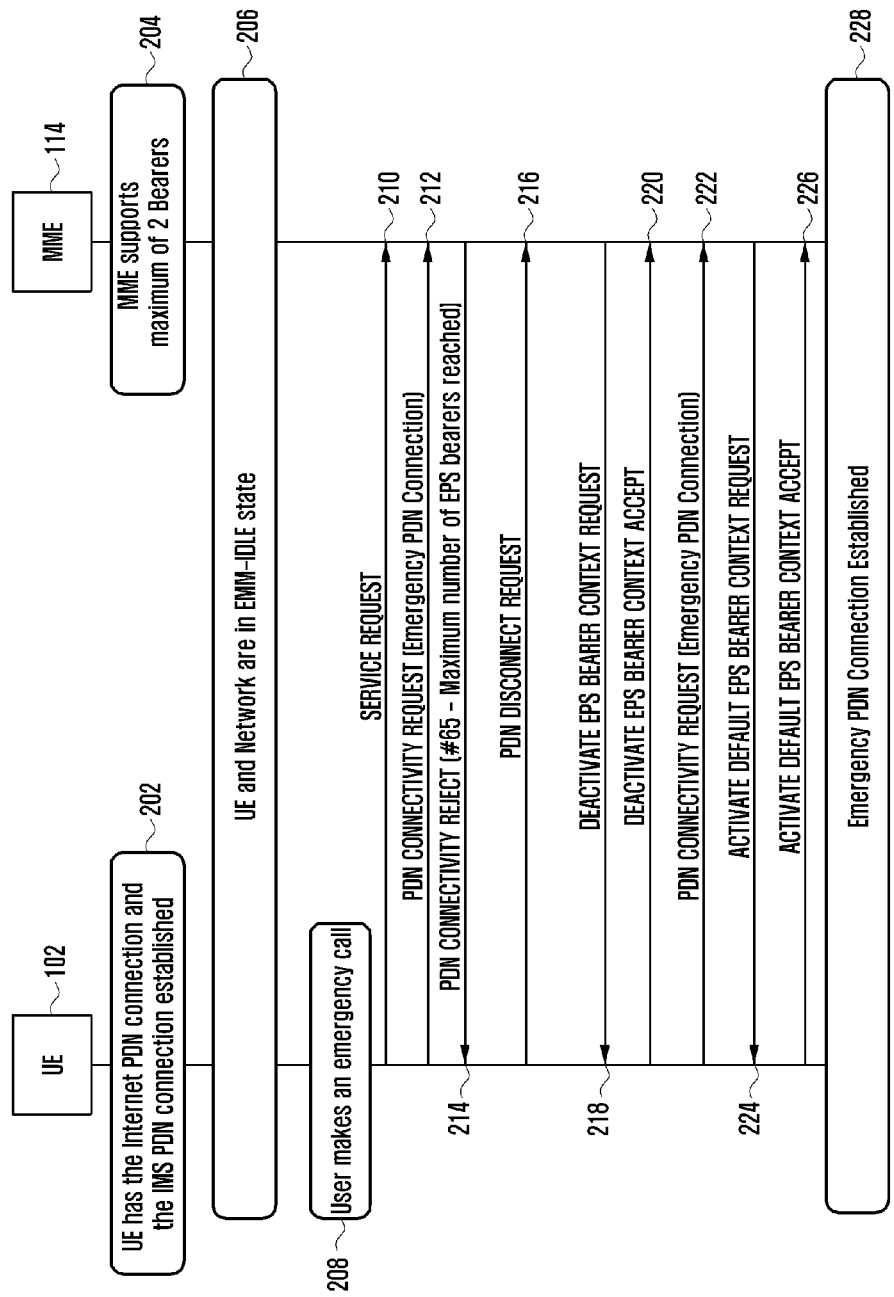
FIG. 2 illustrates signalling messages exchanged between a UE and an MME in an LTE network illustrating the delay that arises when the maximum number of bearers for a UE has already been established and a further bearer is requested, according to conventional LTE systems.
Figure 3:
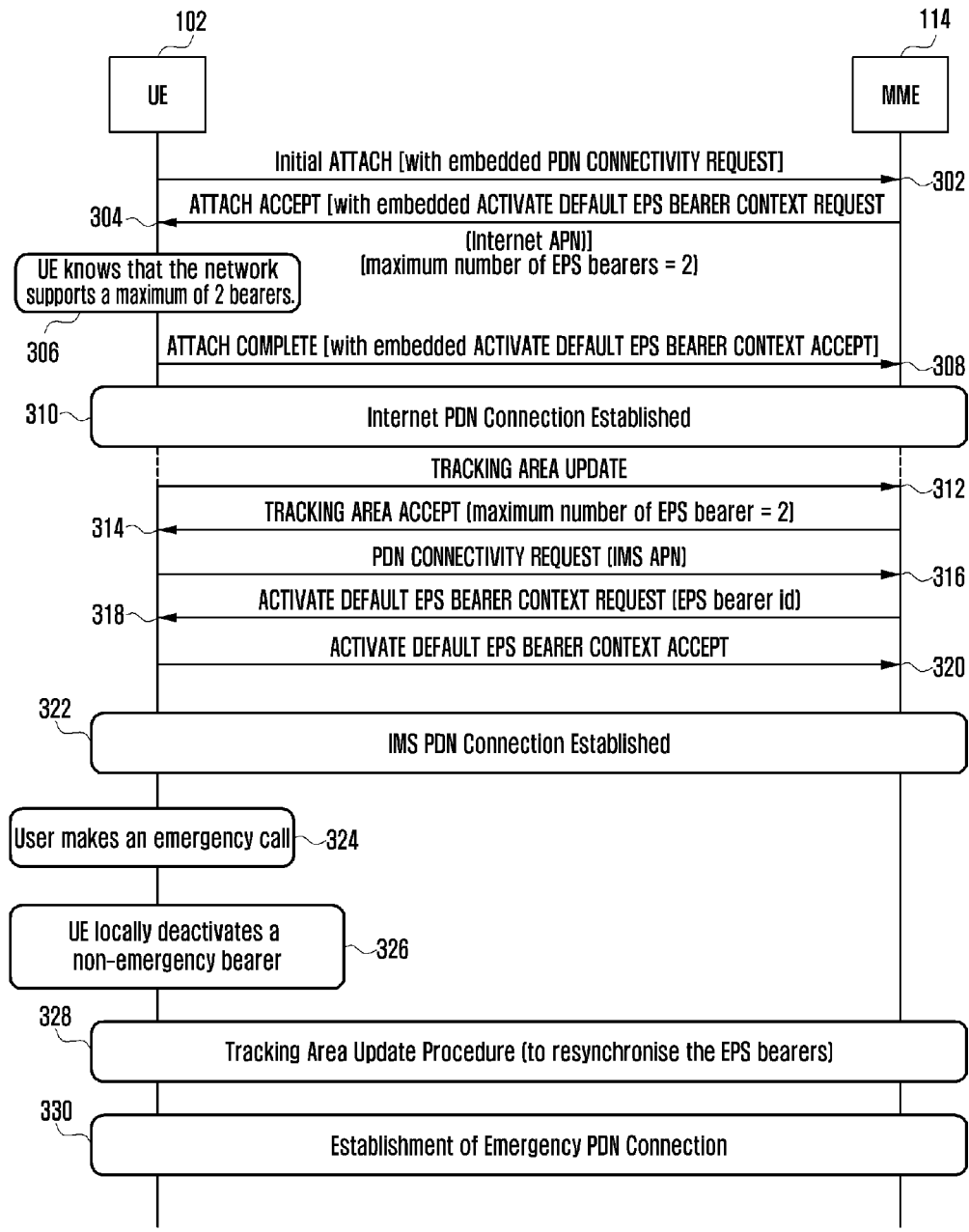
FIG. 3 illustrates signalling messages exchanged between a UE and an MME in an LTE network in which the UE obtains information about the maximum number of bearers supported by the MME, in accordance with a first embodiment of the invention.

Referring now to FIG. 3, at step 302 the UE camps in an LTE cell and initiates an initial attachment procedure by sending an Initial Attach Request message 302 to the MME, including an embedded PDN Connectivity Request ESM message corresponding to message 212 in FIG. 2. In response the MME replies with an Attach Accept message 304 with an embedded Activate Default EPS Bearer Context Request message which includes the EPS bearer identity for a default EPS bearer allowing the UE to access an Internet APN. In accordance with the first embodiment of the invention the Attach Accept message further incorporates a new IE indicating the maximum number of EPS bearers that may be established for the UE (in this example two). Consequently, at point 306 the UE now knows that the network supports a maximum of two bearers in advance of attempting to request more than the maximum number of bearers, and can store the maximum number at this point. There is no precedent in PS networks for a mobile device to have this type of advance knowledge. At step 308 the UE replies with an Attach Complete message including an embedded Activate Default EPS Bearer Context Accept message to acknowledge the ESM and EMM parts of the Attach Accept message received from the MME, and at point 310 the Internet PDN connection is established for the UE.

At a later point the UE selects a new cell in a new tracking area with which it was not previously registered causing the UE to send a Tracking Area Update message to the MME at step 312. The MME responds with a Tracking Area Update Accept message 314. In accordance with the first embodiment of the invention the Tracking Area Update Accept message 314 further incorporates a new IE indicating the maximum number of EPS bearers that may be established for the UE (in this example two). It will be appreciated that if the MME changes as a result of the UE changing to a new tracking area then the maximum number of bearers may also change necessitating the retransmission of this information in the Tracking Area Accept message 314.

At steps 316 to 320 the UE requests a new bearer for an IMS connection. This request for a bearer follows the process described above in connection with FIG. 2 at steps 222 to 226, differing only in the details of the requested bearer, and so will not be described in detail. At point 322 an IMS PDN connection is established.

At point 324 the user wishes to make an emergency call. As the UE already has knowledge of the maximum number of bearers, and so is aware that the maximum has now been reached, at point 326 the UE can locally release a non-emergency bearer. At point 328 the UE and the MME perform a Tracking Area Update Procedure to resynchronise the EPS bearers. At point 330 the UE and the MME can then establish the Emergency PDN connection as described in connection with FIG. 2 at steps 222 to 226.

It will be appreciated that in accordance with the first embodiment of the invention the delay described in connection with steps 212 to 214 of FIG. 2 does not arise. This is achieved through sending the maximum bearer information as an IE within EMM messages.

It will be appreciated that the first embodiment of the invention requires modification to 3GPP Attach and Tracking Area Update procedures described in 3GPP TS 24.301. Specifically, the Attach Accept message and the Tracking Area Update Accept messages described in sections 8.3.6.1 and 8.3.3.1 of 3GPP TS 24.301 respectively require modification. Tables 8.2.1.1 and 8.2.26.1 respectively of 3GPP TS 24.301 define the IEs present within the messages. According to the first embodiment of the invention, a further IE with the identifier "Maximum number of bearers" is added.

As an example of the applicability of the first embodiment of the invention to alternative PS networks, for a General Packet Radio Service (GPRS) network in accordance with 3GPP TS 24.008 a Routing Area Update message is used to synchronise the bearers (PDP contexts) between an MS and the Serving GPRS Support Node (SGSN) and information about the maximum number of available PDP contexts may be incorporated into Attach Accept and Routing Area Update Accept messages. The Attach Accept message and the Routing Area Update Accept message are defined in sections 9.4.2 and 9.4.15 of 3GPP TS 24.008 respectively, which define the IEs present within those messages. According to the first embodiment of the invention, a further IE with the identifier "Maximum number of bearers" is added.

In accordance with further embodiments of the invention a solution requiring knowledge at the UE is provided for an LTE network though LTE ESM messaging. In contrast to the first embodiment of the invention, the UE may be informed how many bearers are left available for that UE each time a bearer is established. Alternatively, the UE only obtains knowledge of the maximum number of EPS bearers which can be established for that UE at the time of establishing the last available bearer, but before the UE requests a further bearer. This information may be included when establishing the bearer or may be included outside of the dialog of establishing a bearer. When included as part of establishing a bearer, this may be through the inclusion of an IE in an Activate Default EPS Bearer Context Request (as a stand-alone ESM message and included within the ESM container of the Attach Accept EMM message) or an Activate Dedicated EPS Bearer Context Request ESM message. When included outside of the dialog of establishing a bearer, an ESM Notification message is sent indicating the number of remaining EPS bearers which can be established for that UE, or whether the last bearer has been established. It will be appreciated that for concurrent requests for bearers the UE may only be able to evaluate the maximum number of bearers or the number remaining once all outstanding requests are completed. The ESM Notification message may alternatively indicate that no further bearers can be established for the mobile device in the network, or the maximum number of available bearers.

Figure 4:
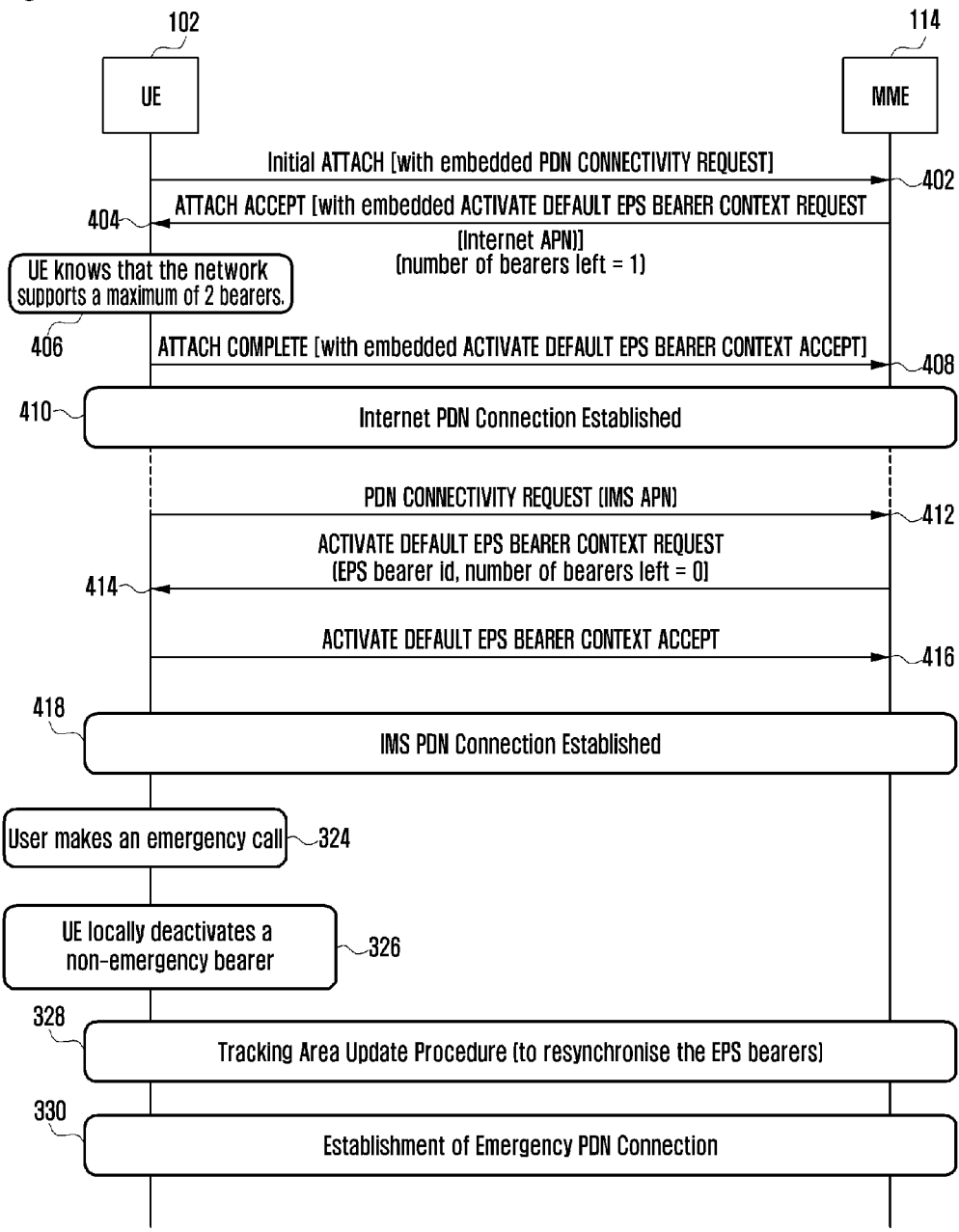
FIG. 4 illustrates signalling messages exchanged between a UE and an MME in an LTE network in which the UE obtains information about the maximum number of bearers supported by the MME, in accordance with a second embodiment of the invention.

Referring now to FIG. 4, a second embodiment of the present invention will now be described in which the UE obtains knowledge of the maximum number of EPS bearers which can be established for that UE through an IE in an Attach Accept message (that is, through ESM level information within an EMM message) or through an IE in an Activate Default EPS Bearer Context Request message (an ESM message). At step 402 the UE camps in an LTE cell and initiates an initial attachment procedure by sending an Initial Attach Request message 402 to the MME, including an embedded PDN Connectivity Request EMM message corresponding to message 302 in FIG. 3. In response the MME replies with an Attach Accept message 404 with an embedded Activate Default EPS Bearer Context Request message which includes the EPS bearer identity for a default EPS bearer allowing the UE to access an Internet APN.

In accordance with the second embodiment of the invention (and in contrast to the first embodiment of the invention described in connection with FIG. 3) the Attach Accept message further incorporates a new IE which makes use of the ESM container contained in the Attach Accept EMM message to indicate the number of bearers still available to be established for the UE (in this example the maximum available bearers is two and so after establishing the default Internet APN EPS bearer the number remaining is one). Consequently, at point 406 the UE now knows that the network supports a maximum of two bearers in advance of attempting to request more than the maximum number of bearers, and can store the maximum number (by calculating the number of established bearers plus the number of remaining bearers). There is no precedent in PS networks for a mobile device to have this type of advance knowledge. At step 408 the UE replies with an Attach Complete message including an embedded Activate Default EPS Bearer Context Accept message to acknowledge the ESM and EMM parts of the Attach Accept message received from the MME, and at point 410 the Internet PDN connection is established for the UE.

At steps 412 to 416 the UE requests a new bearer for an IMS connection. Now that there is one less bearer than the maximum available number of bearers, at 416 the UE sends a PDN Connectivity Request message requesting a bearer for a connection to an IMS PDN. At 414 the MME responds with an Activate Default EPS Bearer Context Request message which includes the EPS bearer identity for the newly established EPS bearer, together with other information including a Quality of Service (QoS) measure and an IP address associated with the bearer which may be needed by the UE to make use of the bearer. Additionally, in accordance with the second embodiment of the invention, the Activate Default EPS Bearer Context Request message incorporates a new IE which makes use of the ESM container contained in the Activate Default EPS Bearer Context Request message to indicate the number of bearers still available to be established for the UE (the number remaining is now none). At 416 the UE returns an Activate Default EPS Bearer Context Accept message which acknowledges receipt of the new bearer information. The UE is now aware that no further bearers can be established. At point 418 an IMS PDN connection is established.

In the event that the user of the UE now wishes to make an emergency call the UE retrieves the stored maximum number of bearers which was calculated when the network was able to establish the last bearer and determines that no further bearers can be established. The remainder of the steps of FIG. 4 correspond directly to the correspondingly numbered steps of FIG. 3, and so will not be described again.

In a further extension to the second embodiment of the invention, the same use is made of an IE indicating the number of remaining bearers available for allocation in an Activate Dedicated EPS Bearer Context Request ESM message when a UE requests a dedicated bearer by sending a Bearer Resource Allocation Request message including an EPS bearer identity for the associated default bearer.

As an alternative to the second embodiment of the invention, the IEs in the Activate Default EPS Bearer Context Request messages and the Activate Dedicated EPS Bearer Context Request messages may inform the UE of the maximum number of bearers allows by the MME (as for the first embodiment of the invention) in place of the remaining number of bearers.

It will be appreciated that the second embodiment of the invention requires modification to the NAS protocol described in 3GPP TS 24.301. Specifically, the Activate Default EPS Bearer Context Request message and the Activate Dedicated EPS Bearer Context Request message described in sections 8.3.6.1 and 8.3.3.1 of 3GPP TS 24.301 respectively require modification. As discussed above, these messages are sent by the MME to the UE to request activation of a default EPS bearer context or a dedicated EPS bearer context associated with the same PDN address and APN as an already existing default EPS bearer. Tables 8.3.6.1 and 8.3.3.1 respectively of 3GPP TS 24.301 define the IEs present within the messages. Additionally, the Attach Accept message described in section 8.3.6.1 of 3GPP TS 24.301 requires modification. According to the second embodiment of the invention, a further IE with the identifier "Number of bearers left" or "Maximum number of bearers" is added.

As an example of the applicability of the second embodiment of the invention to alternative PS networks, for a General Packet Radio Service (GPRS) network in accordance with 3GPP TS 24.008 this information may be provided to the MS through Activate PDP Context Accept and Activate Secondary PDP Context Accept messages. The Activate PDP Context Accept message and Activate Secondary PDP Context Accept message are defined in sections 9.5.2 and 9.5.5 of 3GPP TS 24.008 respectively, which define the IEs present within those messages. According to the second embodiment of the invention, a further IE with the identifier "Number of bearers left" or "Maximum number of bearers" is added.

Figure 5:
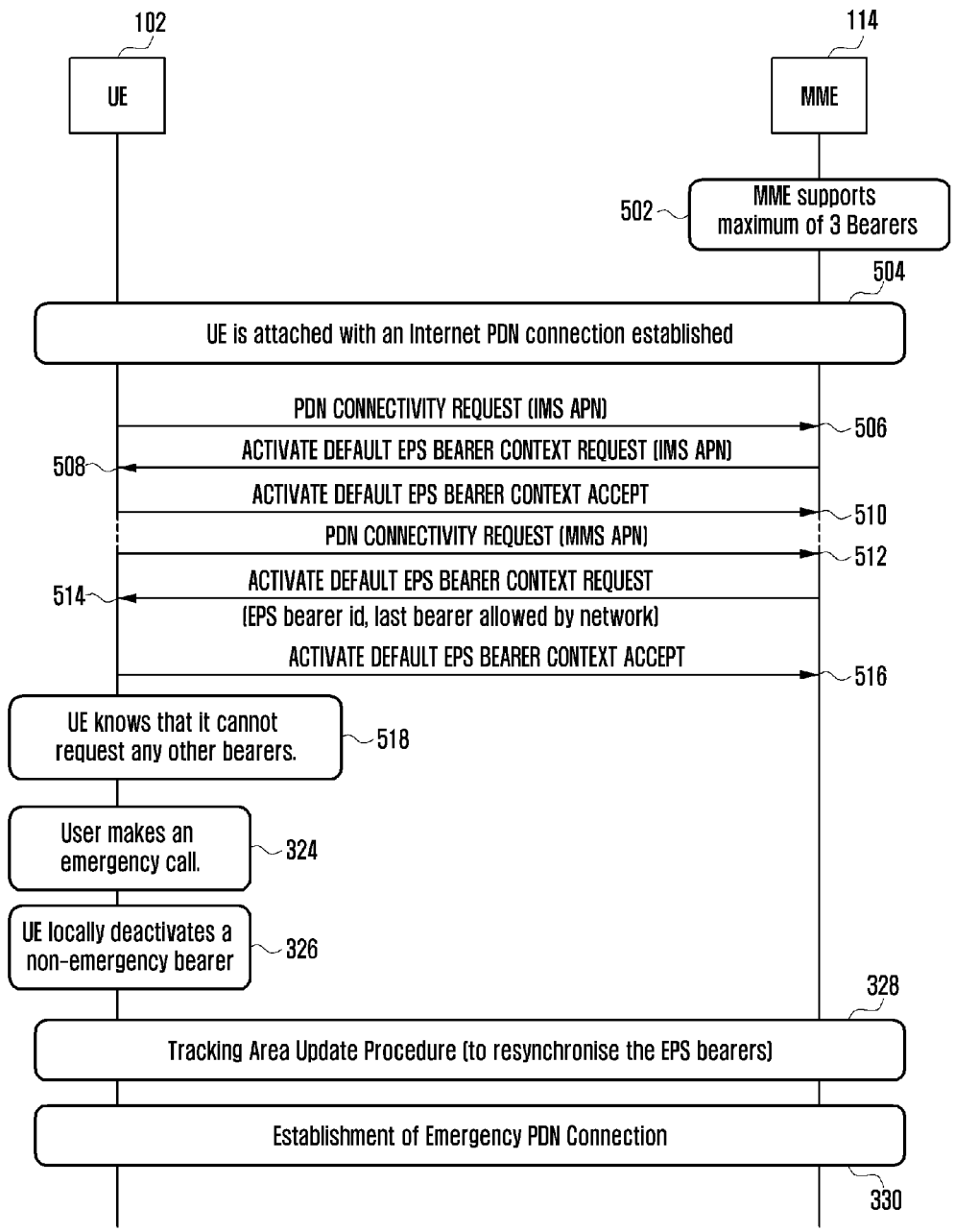
FIG. 5 illustrates signalling messages exchanged between a UE and an MME in an LTE network in which the UE obtains information about the maximum number of bearers supported by the MME, in accordance with a third embodiment of the invention.

Referring now to FIG. 5, a third embodiment of the present invention will now be described in which the UE obtains knowledge of the maximum number of EPS bearers which can be established for that UE through an IE in an Activate Default EPS Bearer Context Request message or an Activate Dedicated EPS Bearer Context Request message (that is, through ESM messaging). The third embodiment of present invention is generally similar to the second embodiment of the invention except that instead of informing the UE of the remaining number of bearers that can be established (or the maximum number that can be established) the UE is only informed when the last available bearer has been established. Although FIG. 5 shows the Activate Default EPS Bearer Context Request or Activate Dedicated EPS Bearer Context Request messages as standalone ESM messages, in the event that the network only allows one bearer, then the last available bearer indication is included in the Activate Default EPS Bearer Context Request included in the ESM container of an Attach Accept EMM message. Advantageously, sending an indication that the last bearer has been allocated avoids the need for the UE to receive (or calculate from the number of bearers remaining indication) and store the maximum amount of bearers before the maximum has been reached.

At point 502 of FIG. 5 it is noted that the MME supports a maximum of three bearers. At point 504 it is noted that the UE is attached with an Internet PDN connection is established (such that one the available bearers has been used up).

At steps 506 to 510 the UE requests a new bearer for an IMS connection. At 506 the UE sends a PDN Connectivity Request message requesting a bearer for a connection to an IMS PDN. At 508 the MME responds with an Activate Default EPS Bearer Context Request message which includes the EPS bearer identity for the newly established EPS bearer, together with other information including a Quality of Service (QoS) measure and an IP address associated with the bearer which may be needed by the UE to make use of the bearer. In contrast to the second embodiment of the invention, no information regarding the available bearers is included in message 508 as the last bearer has not been established. At 510 the UE returns an Activate Default EPS Bearer Context Accept message which acknowledges receipt of the new bearer information. The UE is not yet aware of how many bearers remain to be established.

At steps 512 to 516 the UE requests a new bearer for a Multimedia Messaging System (MMS) connection. At 512 the UE sends a PDN Connectivity Request message requesting a bearer for a connection to an MMS PDN. At 514 the MME responds with an Activate Default EPS Bearer Context Request message which includes the EPS bearer identity for the newly established EPS bearer, together with other information including a Quality of Service (QoS) measure and an IP address associated with the bearer which may be needed by the UE to make use of the bearer. This time, in accordance with the third embodiment of the invention, the Activate Default EPS Bearer Context Request message incorporates a new IE which makes use of the ESM container contained in the Activate Default EPS Bearer Context Request message to indicate that the last remaining bearer has been established for the UE. At 516 the UE returns an Activate Default EPS Bearer Context Accept message which acknowledges receipt of the new bearer information. At point 518 the UE is now aware for the first time that no bearers remain to be established, and the UE can determine that the maximum number of bearers available for the UE is equal to the number of currently established bearers.

In the event that the user of the UE now wishes to make an emergency call the UE is aware that no further bearer can be established until an existing bearer is deactivated. The remainder of the steps of FIG. 5 correspond directly to the correspondingly number steps of FIG. 3, and so will not be described again.

In a further extension to the third embodiment of the invention, the same use is made of an IE indicating that the last remaining bearer has been allocated in an Activate Dedicated EPS Bearer Context Request message when a UE requests a dedicated bearer by sending a Bearer Resource Allocation Request message including an EPS bearer identity for the associated default bearer.

It will be appreciated that the third embodiment of the invention requires modification to the NAS protocol described in 3GPP TS 24.301. Specifically, the Activate Default EPS Bearer Context Request message and the Activate Dedicated EPS Bearer Context Request message described in sections 8.3.6.1 and 8.3.3.1 of 3GPP TS 24.301 respectively require modification. As discussed above, these messages are sent by the MME to the UE to request activation of a default EPS bearer context or a dedicated EPS bearer context associated with the same PDN address and APN as an already existing default EPS bearer. Tables 8.3.6.1 and 8.3.3.1 respectively of 3GPP TS 24.301 define the IEs present within the messages. According to the third embodiment of the invention, a further IE with the identifier "Last context activated" is added.

In a further extension to the third embodiment of the invention, a Notification message in accordance with section 8.3.18A of 3GPP TS 24.301 may be used to indicate to the UE that the network has reached the maximum number of available bearers (that is, the last remaining bearer has been allocated). A Notification message may be used instead of informing the UE in an Activate Default EPS Bearer Context Request message or Activate Dedicated EPS Bearer Context Request message. A Notification message is a separate ESM message, and its use in this context requires the specification of a new cause value.

As an example of the applicability of the third embodiment of the invention to alternative PS networks, for a General Packet Radio Service (GPRS) network in accordance with 3GPP TS 24.008 this information may be provided to the MS through Activate PDP Context Accept and Activate Secondary PDP Context Accept messages. The Activate PDP Context Accept message and Activate Secondary PDP Context Accept message are defined in sections 9.5.2 and 9.5.5 of 3GPP TS 24.008 respectively, which define the IEs present within those messages. According to the third embodiment of the invention, a further IE with the identifier "Last context activated" is added.

In accordance with a fourth embodiment of the invention a solution which does not require knowledge at the UE is provided by allowing the network to arbitrarily deactivate a bearer in order to accommodate a requested bearer if the maximum number of bearers has already been established. In particular, a non-emergency bearer may be deactivated in order to accommodate an emergency PDN connection. The UE does not need to know that the network has reached the maximum permitted number of bearers until the UE attempts to establish a further PDN connection. Advantageously, the fourth embodiment of the invention does not require any modifications to TS 24.301, and in particular no modifications to EMM or ESM signalling messages between the UE and the MME. After the emergency call has ended a tracking area update procedure can be initiated to resynchronise the bearers between the UE and the MME.

Figure 6:
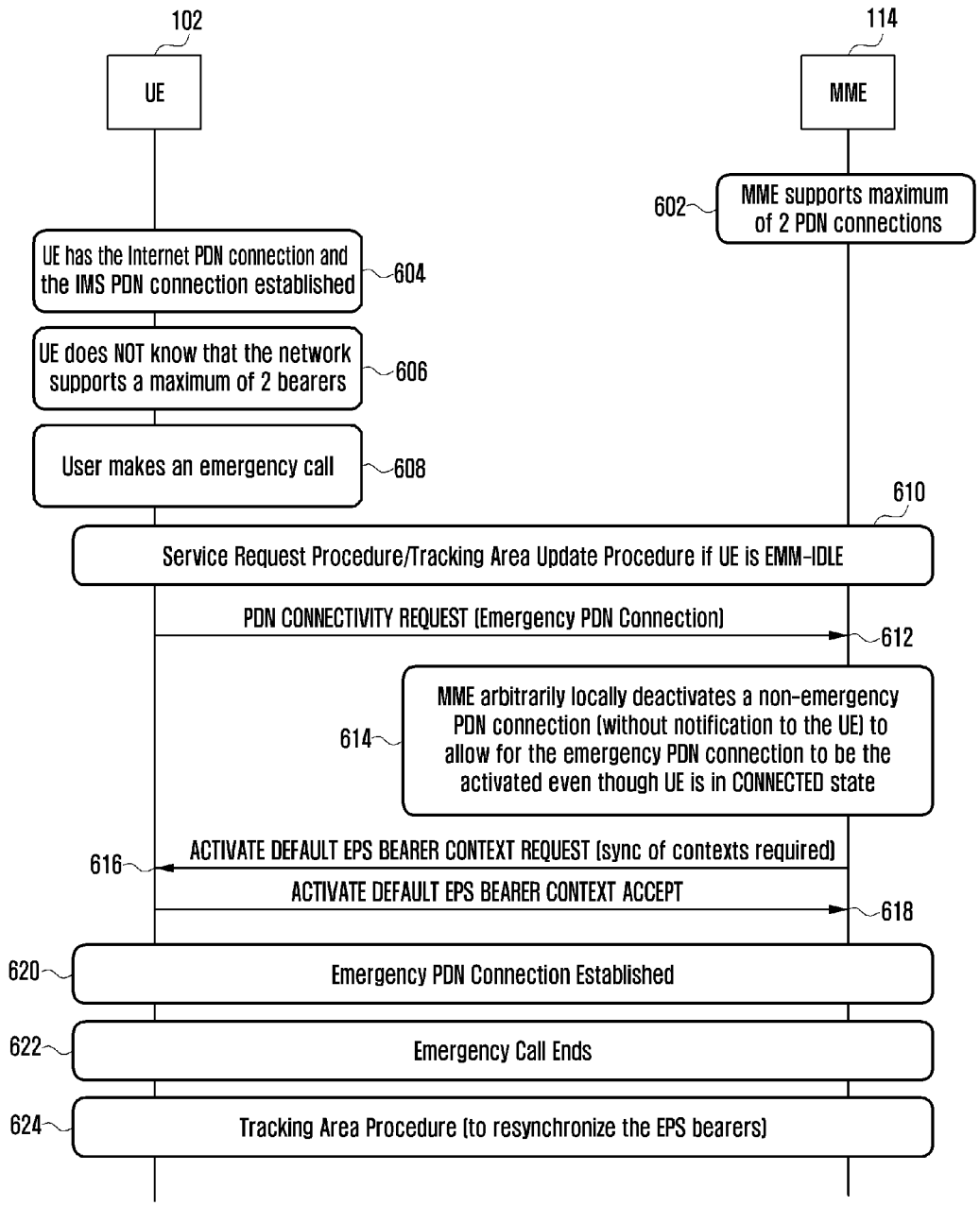
FIG. 6 illustrates signalling messages exchanged between a UE and an MME in an LTE network in which the MME arbitrarily and locally deactivates a non-emergency PDN connection, in accordance with a fourth embodiment of the invention.

Referring to FIG. 6, in accordance with the fourth embodiment at point 602 it is noted that the MME supports a maximum of two PDN connections per UE. At point 604 it is noted that the UE has already established an Internet PDN connection and an IMS PDN connection, and so the maximum number of bearers has already been established. However, in contrast to the above described embodiments of the invention, at point 606 it is noted that the UE does not know how many bearers the network supports, and does not know that the maximum has been reached.

At point 608 the user of the UE wishes to make an emergency call. At point 610, if the UE is in the EMM-IDLE state a service request procedure or a tracking area update procedure is performed to move the UE to EMM-CONNECTED state. At step 612 the UE sends a PDN Connectivity Request message to the MME requesting a further bearer for a connection to an emergency PDN. This corresponds to step 212 of FIG. 2, in which according to conventional LTE networks the MME responds with a PDN Connectivity Reject message. However, according to the fourth embodiment of the invention, instead the MME arbitrarily and locally deactivates a non-emergency PDN connection without notifying the UE to allow the emergency PDN connection to the activated straightaway even though the UE is in the EMM-CONNECTED state.

At step 616 the MME responds with an Activate Default EPS Bearer Context Request message which includes the EPS bearer identity for the newly established EPS bearer. At 618 the UE returns an Activate Default EPS Bearer Context Accept message which acknowledges receipt of the new bearer information. At point 620 the emergency call is established. The UE remains unaware that a bearer has been deactivated. However, the Activate Default EPS Bearer Context Request message includes an indication that a synchronisation of bearer contexts procedure is required.

To convey to the UE the need to synchronise bearers, the Activate Default EPS Bearer Context Request message described in section 8.3.6.1 of 3GPP TS 24.301 requires modification. Table 8.3.6.1 of 3GPP TS 24.301 defines the IEs present within the message. According to the fourth embodiment of the invention, a further IE with the identifier "Synchronisation of contexts required" is added.

At point 622 the emergency call ends. At point 624 a bearer context synchronisation procedure takes place by the UE sending a Tracking Area Update message and the MME responding with a Tracking Area Update Accept message.

As an alternative to the fourth embodiment of the invention, instead of sending the "sync" parameter "in-dialog" as part of an Activate Default EPS Bearer Context Request message the network could instead send an ESM Status message containing the EPS bearer id that was deactivated by the network. The ESM Status message is described in section 8.3.15 of 3GPP TS 24.301. Table 8.3.15.1 of 3GPP TS 24.301 defines the IEs present within the message. The ESM Status message is already equipped to allow the inclusion of an EPS bearer id, but requires modification to create a new cause code "Bearer Deactivated Locally by Network". In response to receiving the ESM Status message the UE locally deactivates the bearer indicated in the ESM status message.

Figure 7:
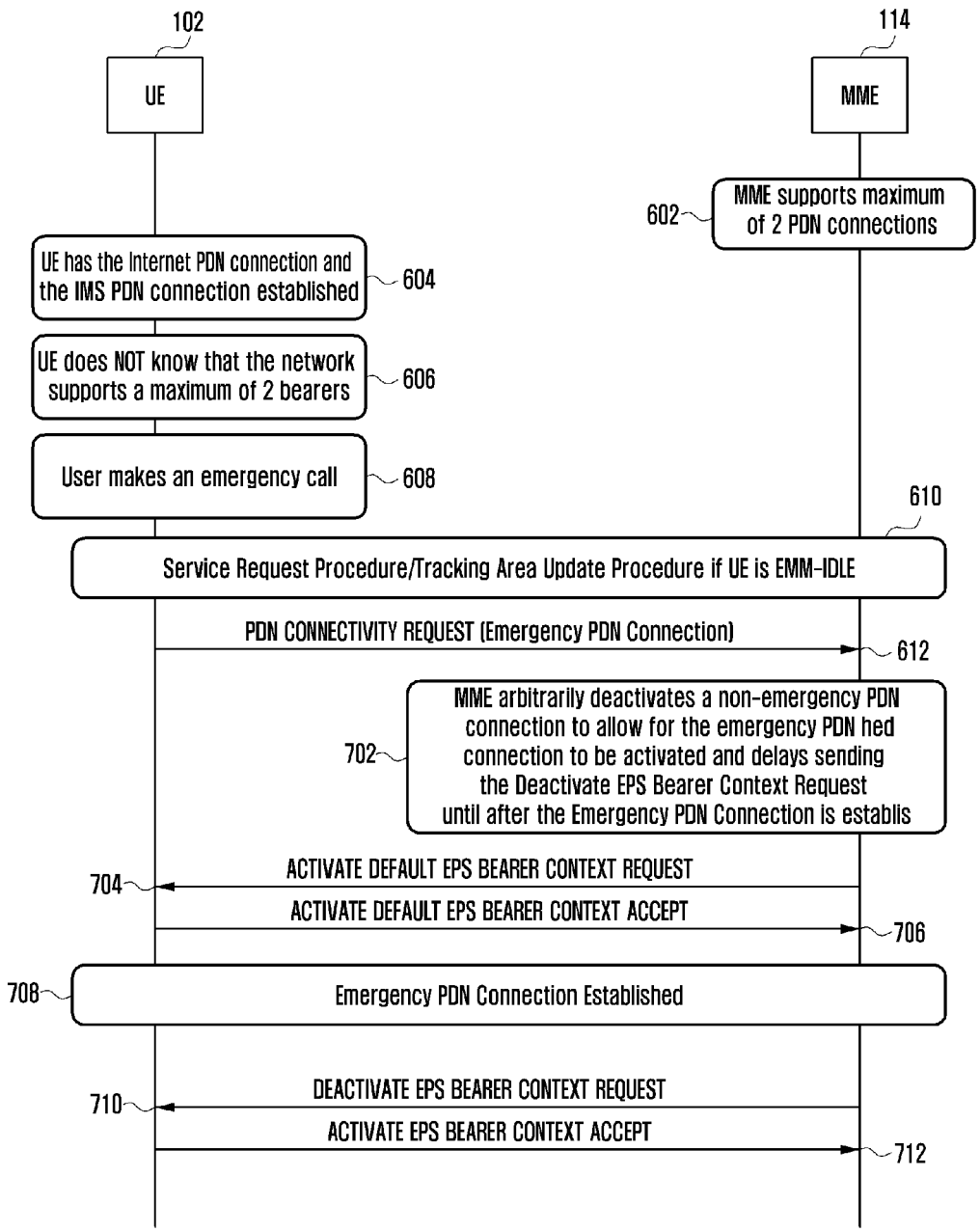
FIG. 7 illustrates signalling messages exchanged between a UE and an MME in an LTE network in which the MME arbitrarily and explicitly deactivates a non-emergency PDN connection, in accordance with a fifth embodiment of the invention.

In accordance with a fifth embodiment of the present invention, illustrated in FIG. 7, a deactivate bearer procedure can be initiated during or after the emergency call. There is no precedent in TS 24.301 for the network to arbitrarily deactivate an EPS bearer in this way, and no precedent in any PS network for minimising delays in establishing bearers in this way, and particularly bearers for emergency calls.

Referring to FIG. 7, this is similar to the fourth embodiment of the invention illustrated in FIG. 6, except that the MME records the fact that a bearer has been deactivated and sends a Deactivate EPS Bearer Context Request message after the emergency call has been established. This process of sending a deactivation request is an explicit deactivation, as opposed to the local deactivation discussed above in connection with FIG. 6. Both local deactivation (when the mobile device is in an EMM-Idle mode) and explicit deactivation (when the mobile device is in an EMM-Connected mode) can be considered to be the network node releasing the bearer. Steps 602 to 612 are the same as for FIG. 6. However, at step 702 the Activate Default EPS Bearer Context Request message gives no indication that a synchronisation of bearer contexts procedure is required. At step 704 the MME responds with an Activate Default EPS Bearer Context Request message which includes the EPS bearer identity for the newly established EPS bearer. At 706 the UE returns an Activate Default EPS Bearer Context Accept message which acknowledges receipt of the new bearer information. At point 708 the emergency call is established. The UE remains unaware that a bearer has been deactivated. In contrast to the fourth embodiment of the invention, after the emergency call is established the MME sends a Deactivate EPS Bearer Context Request message to the UE at step 710 indicating which bearer has been deactivated, and the UE updates its locally stored list of bearers and responds at step 712 with a Deactivate EPS Bearer Context Accept message. It will be appreciated that the explicit deactivation request could be sent in parallel to the emergency call setup. There is no need for synchronisation between the setup of the PDN connection and the deactivation. Advantageously, the fifth embodiment of the invention requires no changes to LTE protocols to implement and so may be the preferred implementation option for MME vendors.

As an example of the applicability of the fourth embodiment of the invention to alternative PS networks, for a General Packet Radio Service (GPRS) network in accordance with 3GPP TS 24.008 a synchronisation of contexts required procedure may be initiated by the network through Activate PDP Context Accept and Activate Secondary PDP Context Accept messages used to synchronise the bearers (PDP contexts) between an MS and the Serving GPRS Support Node (SGSN). Alternatively this synchronisation may be performed by the network sending a Deactivate PDP Context Request message.

While embodiments of the present invention described above relate specifically to 3GPP compliant LTE mobile communication systems, and refer to particular 3GPP Technical Specifications, as noted above the present invention is more widely applicable. The present invention may be implemented in any PS mobile communication system where corresponding bearer management issues arise. Specifically, the present device is applicable to any PS mobile wireless communications network in which a mobile device (LTE: UE) communicates with a network node, or an external network or server (LTE: P-GW) through a bearer (LTE: EPS bearer) and a limited, unknown number of bearers can be established for that mobile device, and signalling messages are exchanged between the mobile device and a network node (LTE: MME).

It will be appreciated that embodiments of the present invention can be realized in the form of hardware, software or a combination of hardware and software. Any such software may be stored in the form of volatile or non-volatile storage, for example, a storage device like a ROM, whether erasable or rewritable or not, or in the form of memory, for example, RAM, memory chips, device or integrated circuits or on an optically or magnetically readable medium, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium including a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of establishing a bearer in a packet switched mobile wireless communications network comprising a mobile device and a network node, wherein a predetermined maximum number of bearers can be established for the mobile device within the network, the method comprising:
   sending bearer information from the network node to the mobile device either:
   when the number of bearers currently established for the mobile device within the network is less than the predetermined maximum number of bearers; or
   before a request for a further bearer is received at the network node from the mobile device if the number of bearers currently established for the mobile device within the network is equal to the predetermined maximum number of bearers;
   the bearer information indicating one of:
   the predetermined maximum number of bearers that can be established for the mobile device within the network;
   a remaining number of bearers that can be established for the mobile device within the network; or
   that no more bearers can be established for the mobile device within the network; and
   determining at the mobile device at a later point in time that a further bearer is required;
   wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the method further comprises:
   releasing, at the mobile device, a bearer previously established for the mobile device within the network;
   performing a bearer synchronisation procedure between the mobile device and the network node if required;
   sending a request for a further bearer from the mobile device to the network node; and
   establishing the further bearer for the mobile device within the network.

2. The method of claim 1, wherein the bearer information is sent from the network node to the mobile device when the number of bearers currently established for the mobile device within the network is less than the maximum number of bearers allowed by the network for the mobile device and the network establishes a further bearer for the mobile device within the network.

3. The method of claim 1, wherein if the bearer information indicates the maximum number of bearers the method further comprises:
   obtaining at the mobile device the current number of bearers; and
   comparing at the mobile device the current number of bearers to the maximum number of bearers.

4. The method of claim 1, wherein bearer information indicating the maximum number of bearers that can be established is sent from the network node to the mobile device as part of a mobility management signalling message.

5. The method of claim 4, wherein the mobility management signalling message including the bearer information is sent in response to one of:
   a message received at the network node from the mobile device requesting that the mobile device be allowed to join the network;
   a message received at the network node from the mobile device when the mobile device moves between cells within the network; or
   a periodic update message received at the network node from the mobile device.

6. The method of claim 1, wherein bearer information is sent from the network node to the mobile device as part of a session management signalling message.

7. The method of claim 6, wherein the session management signalling message is embedded within a session management container of a mobility management message sent in response to a message received at the network node from the mobile device requesting that the mobile device be allowed to join the network.

8. The method of claim 6, wherein the session management signalling message comprises one of:
   a message sent when activating a bearer for the mobile device within the network in response to a request to establish a further bearer received from the mobile device; and
   a general data session management notification signalling message.

9. The method of claim 1, wherein the requested further bearer is an emergency bearer, priority bearer or a normal bearer.

10. A method of establishing a bearer within a mobile device in a packet switched mobile wireless communications network which further comprises a network node, wherein a predetermined maximum number of bearers can be established for the mobile device within the network, the method comprising:
   receiving bearer information at the mobile device from the network node either:
   when the number of bearers currently established for the mobile device within the network is less than the predetermined maximum number of bearers; or
   before a request for a further bearer is received at the network node from the mobile device if the number of bearers currently established for the mobile device within the network is equal to the predetermined maximum number of bearers;
   the bearer information indicating one of:
   the predetermined maximum number of bearers that can be established for the mobile device within the network;
   a remaining number of bearers that can be established for the mobile device within the network; or
   that no more bearers can be established for the mobile device within the network; and
   determining at the mobile device at a later point in time that a further bearer is required;
   wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the method further comprises:
   releasing, at the mobile device, a bearer previously established for the mobile device within the network;
   performing at the mobile device a bearer synchronisation procedure between the mobile device and the network node if required;
   sending a request for a further bearer from the mobile device to the network node; and
   establishing at the mobile device the further bearer for the mobile device within the network.

11. A method of establishing a bearer within a network node in a packet switched mobile wireless communications network which further comprises a mobile device, wherein a predetermined maximum number of bearers can be established for the mobile device within the network, the method comprising:
   sending bearer information from the network node to the mobile device either:
   when the number of bearers currently established for the mobile device within the network is less than the predetermined maximum number of bearers; or
   before a request for a further bearer is received at the network node from the mobile device if the number of bearers currently established for the mobile device within the network is equal to the predetermined maximum number of bearers;
   the bearer information indicating one of:
   the predetermined maximum number of bearers that can be established for the mobile device within the network;
   a remaining number of bearers that can be established for the mobile device within the network; or
   that no more bearers can be established for the mobile device within the network; and
   wherein if the mobile device at a later point in time determines that a further bearer is required, and if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the method further comprises:
   performing at the network node a bearer synchronisation procedure between the mobile device and the network node if required;
   receiving a request for a further bearer at the network node from the mobile device; and
   establishing at the network node the further bearer for the mobile device within the network.

12. A mobile device within a packet switched mobile wireless communications network which further comprises a network node, wherein a predetermined maximum number of bearers can be established for the mobile device within the network, the mobile device being arranged to establish a bearer, wherein the mobile device is arranged to:
   receive bearer information from the network node either:
   when the number of bearers currently established for the mobile device within the network is less than the predetermined maximum number of bearers; or
   before a request for a further bearer is received at the network node from the mobile device if the number of bearers currently established for the mobile device within the network is equal to the predetermined maximum number of bearers;

the bearer information indicating one of:
the predetermined maximum number of bearers that can be established for the mobile device within the network;
a remaining number of bearers that can be established for the mobile device within the network; or
that no more bearers can be established for the mobile device within the network; and
determine at a later point in time that a further bearer is required;
wherein if the bearer information indicates the maximum number of bearers and the current number of bearers is equal to the maximum number of bearers, or if the bearer information indicates that the remaining number of bearers is zero, or if the bearer information indicates that that no more bearers can be established for the mobile device within the network the mobile device is further arranged to:
release a bearer previously established for the mobile device within the network;
perform a bearer synchronisation procedure between the mobile device and the network node if required;
send a request for a further bearer from the mobile device to the network node; and
establish the further bearer for the mobile device within the network.

* * * * *